United States Patent [19]

Gemperle et al.

[11] 4,369,333
[45] Jan. 18, 1983

[54] METHOD AND APPARATUS FOR ENCIPHERING AND DECIPHERING OF INFORMATION

[75] Inventors: Bruno Gemperle, Steinhausen; Oskar Stürzinger, Baar, both of Switzerland

[73] Assignee: Crypto AG, Steinhausen, Switzerland

[21] Appl. No.: 175,370

[22] Filed: Aug. 5, 1980

[30] Foreign Application Priority Data

Aug. 17, 1979 [CH] Switzerland .................. 7551/79

[51] Int. Cl.³ .................................. H04L 9/02
[52] U.S. Cl. .......................... 178/22.13; 178/22.17
[58] Field of Search ............... 178/22.03, 22.12, 22.13, 178/22.14, 22.15, 22.17

[56] References Cited

U.S. PATENT DOCUMENTS

| | | | |
|---|---|---|---|
| 4,145,568 | 3/1979 | Ehrat | 178/22.16 |
| 4,168,395 | 9/1979 | Safford | 178/22.13 |
| 4,169,212 | 9/1979 | Kinch, Jr. et al. | 178/22.16 |
| 4,176,246 | 11/1979 | Gaetzi | 178/22.13 |

Primary Examiner—Howard A. Birmiel
Attorney, Agent, or Firm—Werner W. Kleeman

[57] ABSTRACT

Plain text or information which is to be processed at the transmitter end of the system is formed by groups of plain text or information signals which are separated by separation signals. In the absence of plain information signals there are inserted fill signals between the plain information signal groups, these fill signals likewise being separated by separation signals. At the transmitter end there are enciphered, apart from the plain information signals and possibly the fill signals, all or a part of the separation signals. The signal flow which appears at the transmission path no longer is divided in a clearly recognizable manner into individual packets. In order to render possible at the receiver end of the system separation of information signals and fill signals which are insignificant as to their information content, during the course of the transmitter end enciphering the separation signals between the fill signals are provided with an appropriate characteristic or recognition information.

11 Claims, 6 Drawing Figures

METHOD AND APPARATUS FOR ENCIPHERING AND DECIPHERING OF INFORMATION

CROSS-REFERENCE TO RELATED PATENTS

This application is related to U.S. Pat. No. 3,036,156, U.S. Pat. No. 3,083,263, granted Mar. 26, 1963, U.S. Pat. No. 3,546,380, granted Dec. 8, 1970, U.S. Pat. No. 3,752,920, granted Aug. 14, 1973, U.S. Pat. No. 3,683,513, granted Aug. 15, 1972, U.S. Pat. No. 3,702,900, granted Nov. 14, 1972 and U.S. Pat. No. 4,079,195, granted Mar. 14, 1978, German Pat. No. 978,043 and Swiss Pat. No. 604,432.

BACKGROUND OF THE INVENTION

The present invention relates to a new and improved method of, and apparatus for, the enciphering and deciphering of information or data.

Generally speaking, the method of the invention for the enciphering and deciphering of information, contemplates enciphering the plain information signal groups at the transmitter end of the system and which are separated from one another by separation signals and at the receiver end of the system performing an appropriate signal deciphering operation. At the transmitter end, in the absence of plain information signals, there are inserted between the information signal groups fill signals which are insignificant as to their information content.

The apparatus of the invention for enciphering and deciphering information comprises an enciphering device arranged at the transmitter end of the system, which enciphers the received plain text in the form of information signal groups, separated from one another by separation signals, through the use of key characters. A deciphering device is arranged at the receiver end of the system, which deciphers by means of key characters the received information. At the transmitter end, in the absence of plain text, there is inserted between the plain information signal groups fill signals which are insignificant as to their information content, these fill signals likewise being separated or divided by separation signals.

In the telecommunications art the information or data is frequently transmitted in a binary coded form, either as a continuous pulse train or in the form of pulse packets. A classical example of such data transmission is the CCITT-Code No. 2 used in teleprinters. With this code each character is represented by a combination of five binary pulses of the same length. During the start-stop operation there is incorporated a start step and a stop step before and after each of the pulse groups representing a character, in order to insure for synchronous operation of the transmitter and receiver apparatuses. The start step has the same length as an information or data step, while the stop step has a length amounting to 1.4-fold the length of the information step.

With the CCITT-Code No. 5, wherein each character is represented by a combination of eight binary pulses, the start step likewise has the same length as a data or information step, whereas the stop step has twice such length.

While taking into account these characteristics it is presently possible to design transmission systems which reliably synchronously operate, without having to alter the make-up of the character groups. In synchronous operating transmission systems of this type, of which for instance one has been described in Swiss Pat. No. 495,096 and the corresponding U.S. Pat. No. 3,702,900, there are introduced into the trasmission path during the time intervals where at the transmitter end of the system there is not present any plain text which is to be processed, fill characters which are meaningless as concerns data or information content. These fill characters contain at least the usual separation characters, i.e. start-stop steps, in order to maintain the transmitter in phase for as long as possible and to again bring into synchronism the transitter after a possible connection interruption.

The signal flow along the transmission path enables recognition of those time intervals during which there are transmitted information containing characters, since the intervals between the information or data signals can be readily recognized owing to the identical fill signals. Even if such information containing characters are enciphered third parties are capable of drawing conclusions regarding the activity taking place at the transmitter and receiver end of the system merely because of the message length.

An enciphered transmission of the fill signals also would not be suitable for overcoming this drawback. Since in the mentioned time intervals there are enciphered at the transmitter end always the same fill characters it is possible to break the code, even if at the present time there are known in this regard safe key generators.

SUMMARY OF THE INVENTION

Therefore, with the foregoing in mind it is a primary object of the present invention to provide a new and improved method of, and apparatus for, enciphering and deciphering data in a manner not afflicted with the aforementioned drawbacks and limitations of the prior art.

A further and more specific object of the present invention aims at eliminating the aforementioned disadvantages in a highly effective and reliable manner.

Still a further important and more detailed objective of the invention aims at providing a method and apparatus of the previously mentioned type, wherein it is rendered impossible to recognize the structure of the transmitted signal sequence along the transmission path or link.

Now in order to implement these and still further objects of the invention, which will become more readily apparent as the description proceeds, the method of the present invention for the enciphering and deciphering of information or data is manifested by the features that at least a part of the separation signals are enciphered at the transmitter end of the system.

As to the apparatus of the invention, useful for the practice of the method, the enciphering device serves to encipher at least part of the separation signals.

Since at least there is a partial enciphering of the separation signals which separate both the data or information signals and also the fill signals, the signal sequence at the transmission path no longer appears in the form of divided discernible signal groups, rather forms an unstructured continuous signal flow at which there no longer is possible a separation into individual information containing signal packets or signal packets serving as fill characters. The structure of the signal sequence therefore no longer can be detected. The basic structure of the information or data signal groups is positively retained with the inventive solution.

Now to render possible at the receiver end of the system separation of the fill signals from the signal flow or stream, at least a part of the separation signals which precede the group of fill signals is provided at the transmitter end with a characterizing or recognition information or data, on the basis of which there can be determined at the receiver end that the subsequent signal group is meaningless as concerns its information content. The receiver station now can determine, based upon the transmitter end-characteristic or recognition separation signals, that the subsequent signals are fill signals which, as concerns there information content, are meaningless and, thus, are not required for the subsequent data processing.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1A:
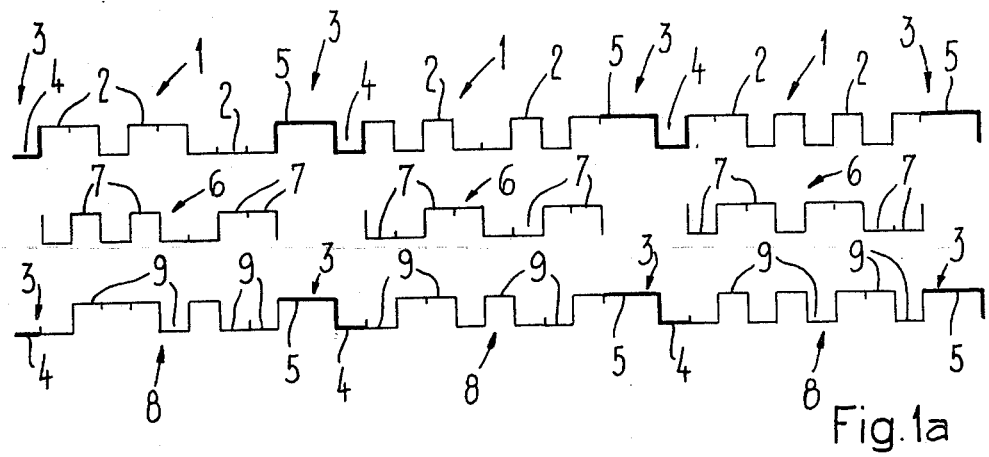
FIGS. 1a, 1b, 1c and 1d respectively illustrate pulse-time diagrams serving to explain the enciphering operation.

Describing now the drawings, there will be explained based upon the signal diagrams of FIGS. 1a to 1d the enciphering of plain characters 1 which are portrayed in CCITT-Code No. 5. As will be apparent by referring to the topmost pulse train shown in FIG. 1a, each of these plain characters 1 consists of eight character elements (or bits) wich are formed by digital plain information signals 2 of the same length. These plain characters 1 are separated from one another by the separation characters 3, which are formed by a separation signal 4 (start step) and a separation signal 5 (stop step). In accordance with the aforementioned CCITT-Code No. 5 the separation signal 4, constituting the start step, possesses the same length as the plain information signals 2, whereas the separation signal 5, forming the stop step, possesses twice such length.

In the diagrams of FIGS. 1a to 1d the intermediate pulse series represent key characters 6 which consist of a given number of key character signals 7. The lowermost pulse train represents the result of enciphering.

In FIG. 1 there is illustrated the known technique of enciphering. The key characters 6 possess the same number of character elements 7 as the plain characters 1, i.e. likewise eight. The enciphering of the plain characters 1 occurs bit-wise modulo 2, i.e. by means of Exlusive-Or-logical operations. The result of this logical operation has been illustrated in the lowermost pulse train, where the enciphered information characters have been designated by reference character 8 and the enciphered information signals by reference character 9. With this known enciphering the separation characters 3, i.e. the separation signals 4 and 5 are *not* incorporated into the enciphering operation. The separation signals 4 and 5 are clearly recognizable at the enciphered pulse trains, as the same will be clearly apparent from the showing of FIG. 1a. The subdivision into the individual enciphered information characters 8 can therefore be readily determined.

Now in order to avoid this, according to the invention, such separation signals 4 and 5 are completely or partially incorporated into the enciphering operation, as the same will be explained based upon the showing of FIGS. 1b, 1c and 1d.

Figure 1B:
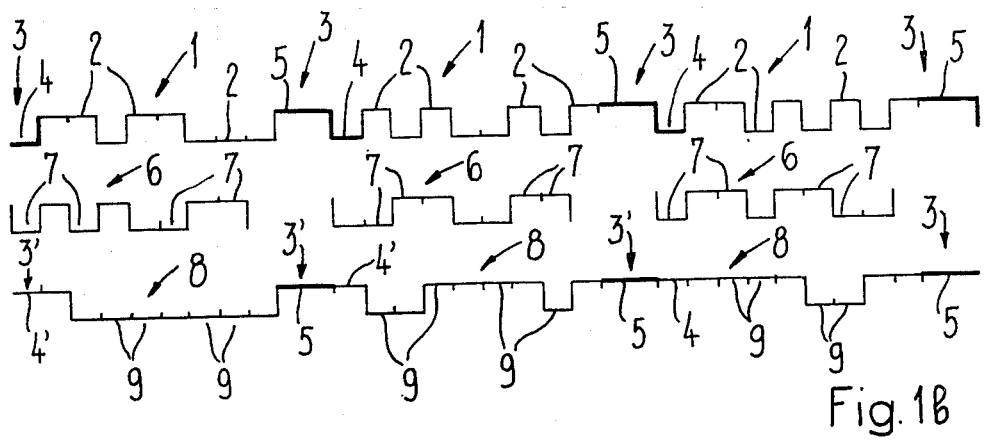

With the embodiment according to FIG. 1b, the key characters 6 again contain the same number of characters elements 7 as in the example according to FIG. 1a, i.e. likewise eight character elements 7, which again are represented by digital, binary signals. In contrast to FIG. 1a these key characters 6 are shifted in relation to the plain characters 1 by the length of bit 2 and 7, respectively, so that during enciphering there will also enciphered in each case the separation signal 4, i.e. the start step. The rearmost bit 2 of each plain character 1 is, however, not exposed to any enciphering. The lowermost pulse train of FIG. 1b illustrates the result of such enciphering, wherein the enciphered information characters likewise have been designated by reference character 8 and the enciphered information signals by reference character 9. The partially enciphered separation characters 3' are thus formed by an enciphered separation signal 4' and the not enciphered separation signal 5.

Figure 1C:
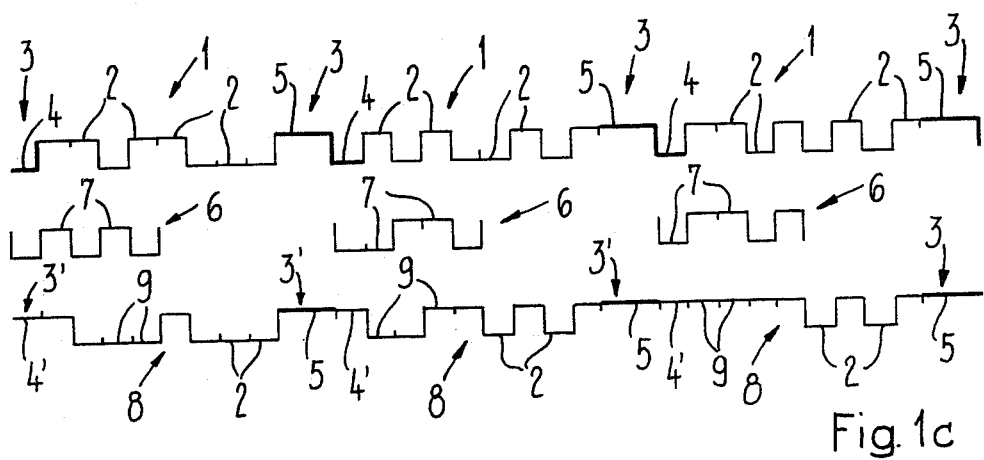

With the variant according to FIG. 1c the key characters 6 only contain five character elements 7, in other words less than the plain characters 1. Also in this case the key characters 6 are shifted in relation to the plain characters 1 by the length of a bit signal 2, 7, in order that, as already explained based upon the showing of FIG. 1b, there is brought about an enciphering of the separation signal 4 (start step). The enciphered information characters 8 now consist of both enciphered information signals 9 as well as not enciphered information signals 2, whereas in the case of the enciphered separation characters 3' the one separation signal 4' is enciphered and the other separation signal 5 is not enciphered.

Figure 1D:
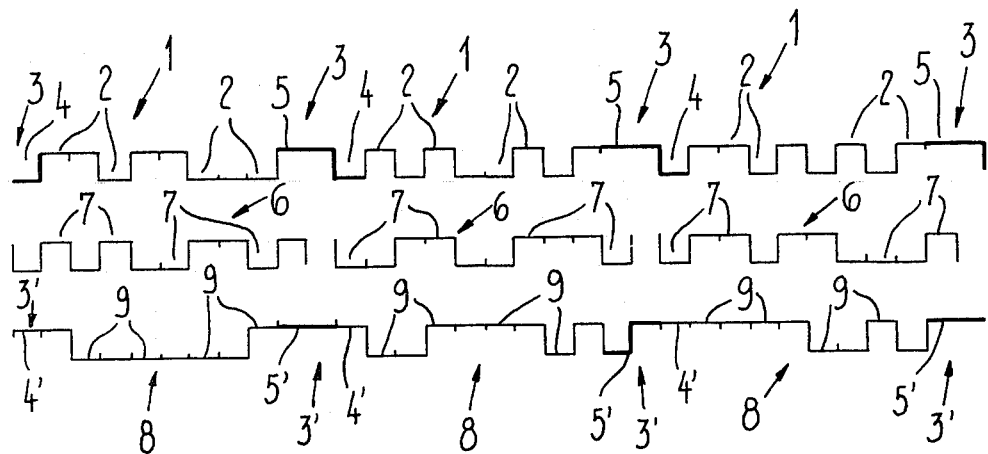

With the variant according to FIG. 1d each key character 6 is formed by ten bits 7, in other words by a larger number of bits than the plain characters 1. Thus, there is accomplished not only a complete enciphering of the plain characters 1 but also a complete enciphering of the separation characters 4 (start step) and one-half of the separation characters 5 (stop step). The pulse train which is obtained by such enciphering now consists of enciphered information characters 8, which completely consist of enciphered information signals 9, and of enciphered separation signals 4' and partially enciphered separation signals 5'.

It should be expressly understood that it would be of course possible to completely encipher the separation characters 3 and not only, as illustrated, to partially encipher such separation characters. The key characters 6 could consist of the same number of character elements 7, a smaller number of character elements 7 or also a larger number of character elements 7 than the clear characters 1.

As clearly indicated in FIGS. 1b, 1c and 1d, the pulse train obtained by the enciphering no longer is divided into individual information signal groups 8 by separation characters which can be readily discerned as such, as in the case with the example according to FIG. 1a.

It is also possible and as already known to carry out the enciphering, not as mentioned bit-wise, rather plain characterwise, as for instance is the case in Swiss Pat. No. 382,216.

As already previously mentioned, at the transmitter and in the absence of plain characters 1 there are inserted fill characters into the spaces between successive plain characters 1. These fill characters have the same structure as the plain characters 1 and likewise are separated from one another by separation characters. As already mentioned, these fill characters serve for the synchronization of the transmitter end and receiver end of the system.

Figure 2:
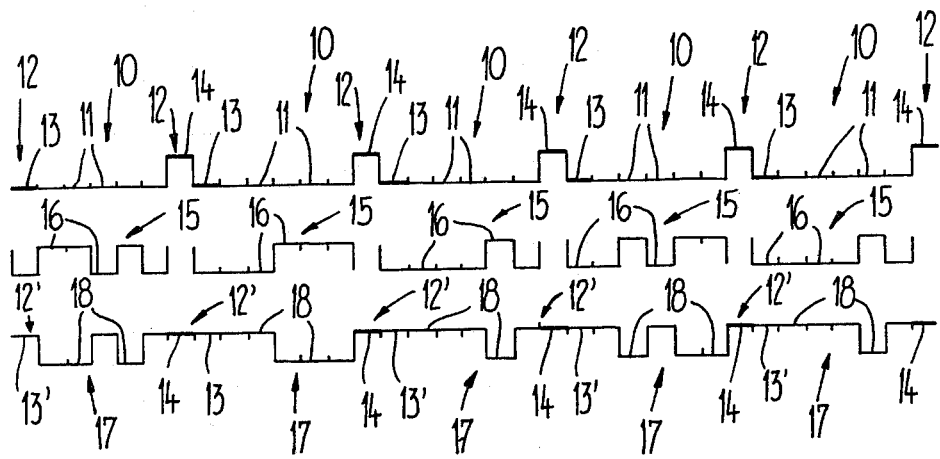
FIG. 2 likewise illustrates pulse-time diagrams serving to explain the enciphering operations.

In FIG. 2 there has been illustrated the enciphering of such fill characters and the related separation characters, whereas in contrast to FIG. 1 there has been chosen for this illustration the CCITT-Code No. 2, wherein as is known a character consists of five character elements formed by digital signals. In the uppermost illustrated pulse train of FIG. 2 these fill characters have been designated by reference character 10 and the fill signals forming such fill characters have been designated by reference character 11. These fill characters 10 correspond to the combination No. 32, but however can correspond to a different combination, for instance the combination No. 29 or No. 30. As mentioned, the fill characters 10 are separated from one another by the separation characters 12, which are formed by a first separation signal 13 (start step) and a second separation signal 14 (stop step). The key characters 15 represented by the pulse groups illustrated at the intermediate portion of FIG. 2 consist of six bits 16.

The number of bits 16 of the key characters 15 is therefore greater than the number of bits 11 of the fill characters 10. The enciphering occurs in accordance with the already discussed bit-wise modulo 2 manner described on the basis of FIG. 1 above. The result of this enciphering operation has been illustrated in the lowermost pulse train of FIG. 2, where the enciphered fill characters have been designated by reference character 17 and the enciphered fill signals by reference character 18. The enciphered separation characters 12' are formed by an enciphered separation signal 13' (start step) and the non-enciphered separation signal (stop step).

Now since the pulse train of FIG. 2, which is obtained by enciphering the fill characters 10, in its structure no longer differs from the pulse train which is obtained by enciphering the plain characters 1 (FIGS. 1b, 1c and 1d), measures now must be provided to ensure that at the receiver end of the system it is possible to distinguish whether the received characters constitute actual information characters which must be deciphered and further transmitted to the receiver, or whether such received characters constitute fill characters which are meaningless as far their information content is concerned, and therefore need not be further transmitted to the receiver.

For this purpose, during the enciphering operation, all or a part of the separation characters 12 are completely or partially provided with a characteristic or recognition information. At the receiver end it is now possible, based upon this characteristic separation character 12, to determine that the following signal group constitutes a fill character.

As is shown in FIG. 2, this characterizing or marking of the separation characters 12 can be accomplished in that, due to the enciphering of the separation signal 13 (start step) there is obtained the other logic state. For instance, if this separation signal 13, prior to enciphering, has the logic state "0", then the enciphered separation signal 13' has the logic state "1", as the same has been illustrated in FIG. 2. This can be readily obtained during a logic operation modulo 2 in that, the corresponding key bit 16 likewise possesses the logic state "0".

As will be apparent from the lowermost pulse train of FIG. 2, there thus follows each separation signal 14 (stop step) the enciphered separation signal 13' which has the same logic state as the preceding separation signal 14. Consequently, it is possible at the receiver end of the system to determine that the following signal group 17 does not constitute any information containing characters. The marking or characterization of the separation character 12 of course can be accomplished in a different manner.

This marking or characterization of the separation characters 12 which separate the fill characters 10 from one another is particularly then important if the code which is used, in contrast to the CCITT-Code No. 2, does not contain any meaningless empty characters, as such for instance is the case for teleprinter codes employed in the Middle East and in Southeast Asia. Here, the characterizing or marking separation character 12 at the receiver end indicates that the next following signal group, which basically can contain information, only serves for filling purposes.

The separation characters 12, instead of as illustrated only being partially enciphered, could be also completely enciphered. The fill characters 10, instead of being completely enciphered, also could only be partially enciphered or not at all. The key characters 15 can possess a number of key bits 16, which is equal to, smaller than or greater than the number of bits 11 which form the fill characters 10.

As already explained, the pulse train obtained by enciphering the fill signal sequence can be identically structured as the enciphered information pulse train, as will be recognized by referring in each case to the lowermost illustrated pulse train respectively shown in FIGS. 1b, 1c, 1d and 2. Therefore, there no longer can be discerned whether there has been transmitted actual information or only fill characters.

Figure 3:
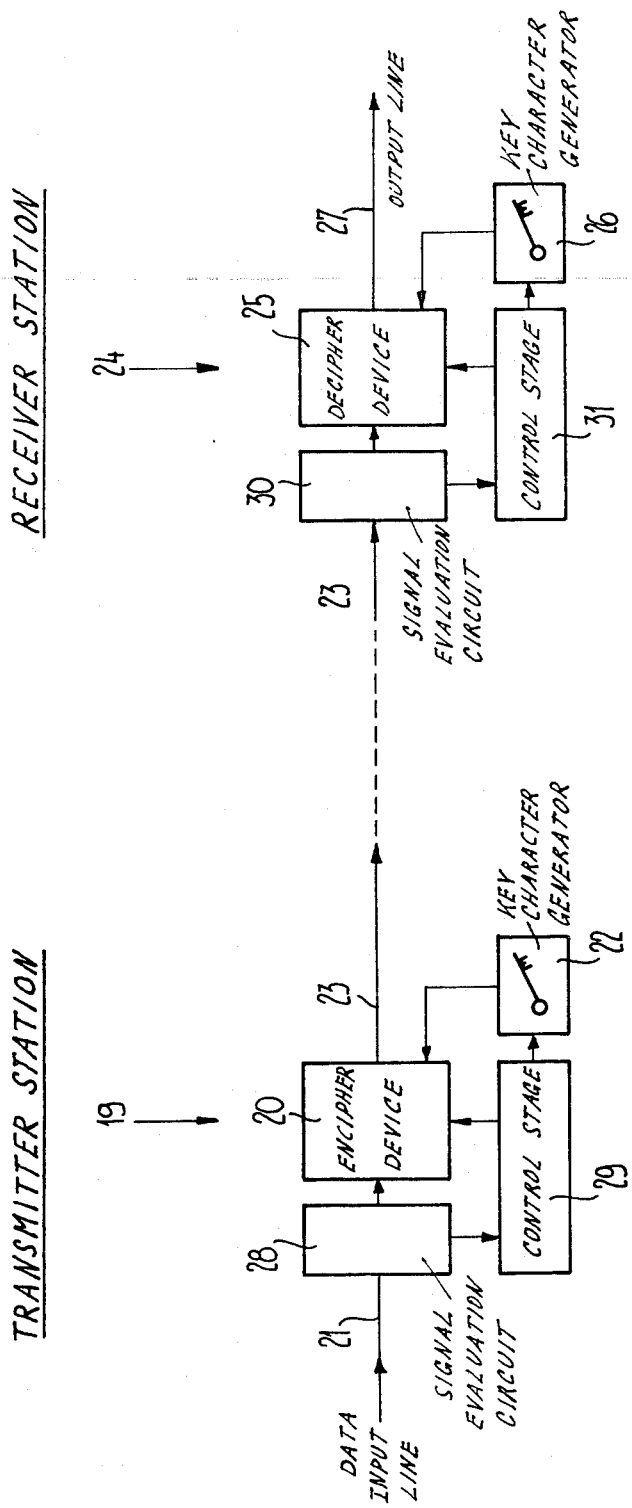
FIG. 3 is a block circuit diagram of an enciphering device and deciphering device at the transmitter station and receiver station.

Based upon the showing of FIG. 3 there will now be described an apparatus for enciphering and deciphering, which operates in accordance with the previously described principles.

The transmitter station 19 contains an enciphering device 20 which receives thereto from an information or message source (not shown) the information or data which is to be enciphered by means of an input line 21. This information, as explained previously based upon FIGS. 1b, 1c and 1d, is entered in the form of information signal groups 1 which are separated from one another by the separation characters 4, 5. In the absence of the information signal groups 1 there appear at the input line 21 fill signal groups 10 which are separated by the separation signals 13, 14, as the same has been explained based upon FIG. 2. At this enciphering device 20 there is connected a key character generator 22, which inserts to the enciphering device 20 the key characters needed for enciphering. The characters which are complelely or partially enciphered and delivered by the enciphering device 20 are fed to a transmission line 23 and transmitted to a receiver station 24. This transmission can also be accomplished in a wireless manner.

In order to decipher the received enciphered information the receiver station 24 contains a deciphering device 25. This deciphering device 25 receives from a key character generator 26 the key characters needed for deciphering. The deciphered information is entered by means of an output line 27 to an information or message sink (not shown).

The key character generators 22 and 26 of the transmitter station 19 and the receiver station 24, as a rule, consist of a basic key storage and a key chain generator, as is well known in this technology.

Also well known is the construction and mode of operation of the enciphering device 20 and the deciphering device 25 and the key character generators 22 and 26. In this regard attention is directed to the detailed description of such components which may be found, for instance, in Swiss Pat. Nos. 374,717 and the corresponding U.S. Pat. No. 3,083,263, Swiss Pat. No. 429,253 and the corresponding U.S. Pat. No. 3,546,380, Swiss Pat. No. 443,744, and Swiss Pat. No. 464,287 and the corresponding U.S. Pat. No. 3,683,513, the disclosure of which is incorporated herein by reference.

The synchronization between the transmitter end-enciphering and receiver end-enciphering can be accomplished for instance in the manner disclosed in Swiss Pat. No. 515,576 and the corresponding U.S. Pat. No. 3,752,920 and Swiss Pat. No. 581,930 and the corresponding U.S. Pat. No. 4,079,195, the disclosure of which is likewise incorporated herein by reference.

Now in order to be able to properly carry out the enciphering at the transmitter end and which has been described based upon FIGS. 1b, 1c, 1d and 2, the transmitter station contains a control circuit which comprises a signal evaluation circuit 28 which is arranged forwardly of the enciphering device 20 and a control stage 29. This control stage 29, in turn, is connected with the signal evaluation circuit 28 and, on the other hand, both with the enciphering device 20 as well as also with the key character generator 22. This control stage 29 controls the course of the enciphering. If the signal evaluation circuit 28 determines that the signals which arrive by means of the input line 21 constitute fill signals 11, which are insignificant as to their information content, then it acts by means of the control stage 29 upon the enciphering device 20 and the key character generator 22, in order to bring about an enciphering of the fill characters 10 and the separation characters 12 as already explained based upon the illustration of FIG. 2. Upon the presence of plain characters 1 there occurs a corresponding control of the enciphering device 20 and the key character generator 22 by means of the signal evaluation circuit 28 and the control stage 29, so that the enciphering of the plain characters 1 and the separation characters 3 is accomplished in the manner described previously based upon the showing of FIGS. 1b, 1c and 1d.

It is also possible to construct the signal evaluation circuit 28 such that it produces at the intervals between the plain characters 1 arriving by means of the input line 21 the fill characters 10 and the separation characters 12. In this case the information or message source is decoupled from the generation of such fill characters 10 and separation characters 12. Also in this case there is accomplished the enciphering of such fill characters 10 and the separation characters 12 in the already described manner.

At the receiver end of the system there is connected forwardly of the deciphering device 25 likewise a signal evaluation circuit 30, which is connected with a control state 31 which is coupled with the deciphering device 25 and the key character generator 26. Just as was the case at the transmitter end of the system, the signal evaulation circuit 30 and the control stage 31 control the course of the deciphering operation. The signal evaluation circuit 30 determines, in the manner already explained previously in conjunction with FIG. 2, the presence at the transmitter end of a separation signal 13' which is provided with a characterizing or flag information. Based upon such flag signal 13' this signal evaluation circuit 30 insures that the fill signals 18 which follow such separation signal 13' are not entered by means of the output line 27 to the message or information sink. If the signal evaulation circuit 30 however determines the presence of enciphered information signals 9, then by means of the control stage 31 it causes a deciphering of such information signals 9, which then following deciphering are delivered as plain information signals, by means of the line 27, to the message or information sink.

In the event that the fill characters are to be transmitted over the transmission line 23 completely or partially non-enciphered, then the enciphering device 20 is appropriately controlled by the signal evaluation circuit 28 and the control stage 29. However, it is here mentioned that also during non-enciphered transmission of the fill characters 10 the separation characters 12 must be completely or partially enciphered between such fill characters 10.

The fill characters 10 can be enciphered or deciphered with the aid of the same key character generators 22 and 26, which also can be used during the enciphering and deciphering of the information signals 1, 9. However, it is also possible to employ for such enciphering and deciphering of such fill characters 10, 18 separate additional key character generators.

Since independent of whether the fill characters 10 are transmitted enciphered or non-enciphered, the separation characters 3 and 12 must be least in part be enciphered, therefore there appears at the transmission path 23 a non-structured pulse train at which there is no longer possible a separation into individual signal packets.

It should be understood that the previously explained method and the described apparatus can also be correspondingly used for the processing of other pulse trains than binary organized pulse trains.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A method for enciphering and deciphering information comprising the steps of:
   enciphering at a transmitter end plain information signal groups which are separated from one another by separation signals;
   carrying out a deciphering of the plain information signal groups at the receiver end;
   inserting at the transmitter end between the information signal groups, upon absence of plain information signals, fill signals which are insignificant as to their information content;
   said fill signals likewise being separated by separation signals; and
   at the transmitter end enciphering at least part of the separation signals.

2. The method as defined in claim 1, further including the steps of:
enciphering at the transmitter end at least part of the fill signals.

3. The method as defined in claim 2, further including the steps of:
forming key characters used for the enciphering and deciphering of the fill characters;
said key characters being formed by a plurality of character elements or bits, whose number is equal, greater or smaller than the number of the character elements forming the fill characters.

4. The method as defined in claim 1, further including the steps of:
providing at the transmitter end at least a part of the separation signals which precede the group of fill signals with a characterizing or flag information on the basis of which there can be determined at the receiver end that the next following signal group is meaningless as concerns its information content.

5. An apparatus for enciphering and deciphering information containing a transmitter end and receiver end, comprising:
an enciphering device provided at said transmitter end;
said enciphering device enciphering the received plain text by means of key characters;
said received plain text being in the form of information signal groups separated from one another by separation signals;
a deciphering device provided at the receiver end;
said deciphering device deciphering the received information by means of key characters;
means for inserting fill signals which are meaningless as to their information content at the transmitter end in the absence of plain text between the clear information signal groups;
said fill signals being divided by separation signals; and
said enciphering device serving to encipher at least part of the separation signals.

6. The apparatus as defined in claim 5, wherein:
said enciphering device enciphers at least a part of the fill signals.

7. The apparatus as defined in claim 5, further including:
a control circuit operatively connected with the enciphering device;
said control circuit insuring that in the presence of fill signals, during enciphering of the separation signals separating such fill signals, at least a part of the separation signals are provided with a characterizing or flag information;
a further control circuit operatively connected with the deciphering device;
said further control circuit determining on the basis of the received separation signals provided with a characterizing or flag information the presence of fill signals which are meaningless as to their information content.

8. The apparatus as defined in claim 7, wherein:
said transmitter end-control circuit contains a signal evaluation circuit arranged forwardly of the enciphering device and a control stage;
said control stage being connected with said signal evaluation circuit and said enciphering device;
said control stage in the presence of fill signals determined by the signal evaluation circuit acting upon the enciphering device in order to at least provide part of the separation signals between the fill signals with the characterizing or flag information.

9. The apparatus as defined in claim 8, wherein:
said signal evaluation circuit generates fill signals upon the absence of information signals.

10. The apparatus as defined in claim 7, wherein: said receiver end-control circuit contains a signal evaluation circuit arranged forwardly of the deciphering device and a control stage;
said control stage being connected with said signal evaluation circuit and said enciphering device;
said signal evaluation circuit of said receiver end-control circuit, upon determination of separation signals provided with characterizing or flag information causing by means of the control stage at the enciphering device a separation of the subsequent fill signals from the information signals.

11. The apparatus as defined in claim 7, wherein: said enciphering device and said deciphering device contain two key character generators which generate key characters;
one of said key character generators serving for the enciphering and deciphering of the information signals and the separation signals which separate such information signals; and
the other key character generator serving for the enciphering and deciphering of the fill signals and the separation signals separating such fill signals.

* * * * *